US007008652B2

(12) United States Patent
Effler

(10) Patent No.: US 7,008,652 B2
(45) Date of Patent: Mar. 7, 2006

(54) METHOD FOR PRODUCTION OF A FLAVORLESS MALT BASE

(75) Inventor: William T. Effler, Mt. Washington, KY (US)

(73) Assignee: Brown-Forman Corporation, Louisville, KY (US)

( * ) Notice: Subject to any disclaimer, the term of this patent is extended or adjusted under 35 U.S.C. 154(b) by 0 days.

(21) Appl. No.: 10/237,974

(22) Filed: Sep. 10, 2002

(65) Prior Publication Data

US 2003/0232108 A1 Dec. 18, 2003

Related U.S. Application Data

(60) Provisional application No. 60/388,306, filed on Jun. 14, 2002.

(51) Int. Cl.
*C12C 1/18* (2006.01)
*C12H 1/052* (2006.01)

(52) U.S. Cl. ............................ 426/11; 426/16; 426/64; 426/423; 426/487

(58) Field of Classification Search .................. 426/11, 426/12, 16, 29, 64, 600, 423, 424, 487
See application file for complete search history.

(56) References Cited

U.S. PATENT DOCUMENTS

| | | | | |
|---|---|---|---|---|
| 2,803,546 | A | | 8/1957 | Bergmann et al. |
| 3,332,779 | A | | 7/1967 | Krabbe et al. |
| 3,798,331 | A | | 3/1974 | Bavisotto et al. |
| 3,843,809 | A | | 10/1974 | Luck |
| 3,908,021 | A | | 9/1975 | Rehberger et al. |
| 4,021,580 | A | | 5/1977 | Raymond et al. |
| 4,180,589 | A | | 12/1979 | Chicoye et al. |
| 4,440,795 | A | | 4/1984 | Goldstein et al. |
| 4,495,204 | A | | 1/1985 | Weaver et al. |
| 4,684,525 | A | | 8/1987 | Plainer et al. |
| 4,765,993 | A | | 8/1988 | Owades |
| 4,775,541 | A | | 10/1988 | Brown et al. |
| 4,816,280 | A | | 3/1989 | Billings |
| 4,885,184 | A | | 12/1989 | Patino et al. |
| 5,021,246 | A | | 6/1991 | Sieben et al. |
| 5,294,450 | A | * | 3/1994 | Word et al. .................. 426/11 |
| 5,439,699 | A | | 8/1995 | Tripp et al. |
| 5,455,052 | A | * | 10/1995 | Owades et al. ............... 426/16 |
| 5,618,572 | A | | 4/1997 | Tripp et al. |
| 5,639,493 | A | | 6/1997 | Tripp et al. |
| 5,728,413 | A | | 3/1998 | Murray et al. |
| 6,361,808 | B1 | | 3/2002 | Souppe et al. |
| 2001/0001673 | A1 | | 5/2001 | Coppens et al. |
| 2001/0043965 | A1 | | 11/2001 | Shimamura et al. |

FOREIGN PATENT DOCUMENTS

EP 1300461 A1 * 4/2003

OTHER PUBLICATIONS

Brett Schulte, "The Buzz of 'Malternatives': TV Ad Campaigns Promote Beverages, and Brands" The Washington Post. Jul. 23, 2002.

* cited by examiner

*Primary Examiner*—Keith Hendricks
(74) *Attorney, Agent, or Firm*—McDermott Will & Emery LLP

(57) ABSTRACT

A flavorless, odorless and colorless malt base is produced by preheating a malt base derived from malt grains in aqueous solution in the presence of an activated charcoal absorbent to remove proteins from the mixture before or after fermenting the mixture in the presence of a yeast to convert carbohydrates to ethyl alcohol. The yeast and activated carbon are then removed and the fermented intermediate beer is subjected to treatment in series with an anion exchange resin, a cation exchange resin and an adsorption resin to remove undesired colors, odors and/or flavors. The resulting flavorless malt base can be used to formulate flavored malt beverages.

18 Claims, 1 Drawing Sheet

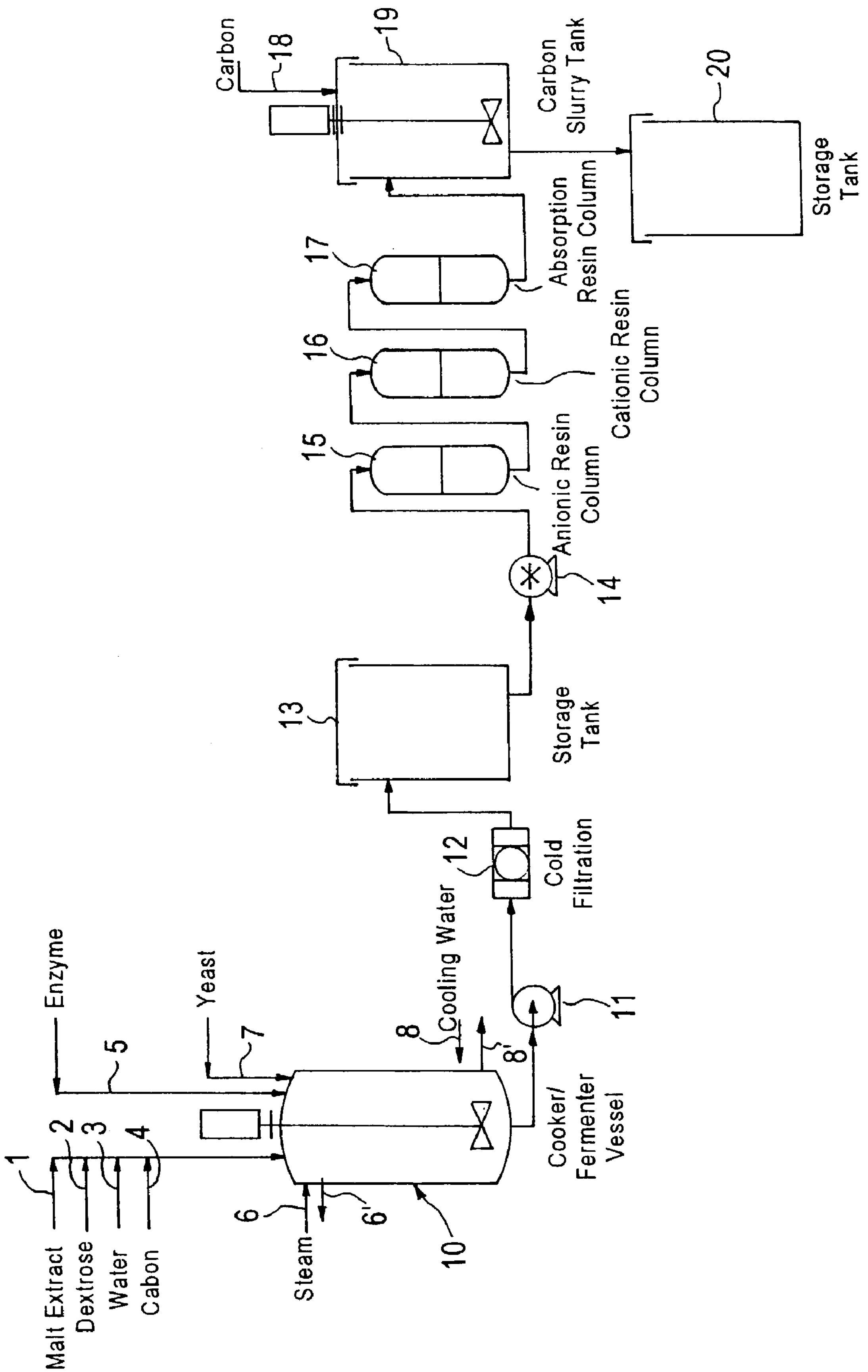
Malt Extract
Dextrose
Water
Cabon
Steam
Enzyme
Yeast
Cooling Water
Cooker/ Fermenter Vessel
Cold Filtration
Storage Tank
Anionic Resin Column
Cationic Resin Column
Absorption Resin Column
Carbon
Carbon Slurry Tank
Storage Tank
1
2
3
4
5
6
6'
7
8
8'
10
11
12
13
14
15
16
17
18
19
20

METHOD FOR PRODUCTION OF A FLAVORLESS MALT BASE

CROSS REFERENCE TO RELATED APPLICATIONS

This application claims the benefit of Provisional Application Ser. No. 60/388,306, filed Jun. 14, 2002.

FIELD OF THE INVENTION

This invention relates to methods for the production of a flavorless malt based solution and more particularly, to methods for the production of highly purified flavorless, colorless and odorless malt based solutions which can be used in the formulation of flavored malt beverages.

BACKGROUND OF THE INVENTION

Malt beverages are commonly known as beers. There are many variations in the types of beer which may be produced from a malt base and in general, each beer has its own flavor. As is well known, beers are made from malts through a fermentation process with yeast, the details of which are well known to those skilled in the art. The present invention is concerned with an alcohol containing beer which is a flavorless, colorless and odorless malt base that can be used in the formulation of malt beverages of varying flavors and colors.

SUMMARY OF THE INVENTION

It is one object of the present invention to provide a novel method for the production of a flavorless malt base.

A further object of the invention is to provide a novel method for the production of a flavorless, colorless and odorless malt base through fermentation of a fermentable carbohydrate mixture derived from malt extract and wherein the flavorless, colorless and odorless malt base can be used in the formulation of malt beverages of varying flavors.

Other objects and advantages of the present invention will become apparent as the description thereof proceeds.

In satisfaction of the foregoing objects and advantages, the invention provides in its broadest embodiment a method for the production of a flavorless, colorless and odorless malt base which can be used to formulate malt beverages of various flavors and colors through addition of flavoring or coloring agents, the method of the invention comprising:

providing a fermentable carbohydrate mixture derived from a malt extract containing malted grain and adjunct sweeteners;

mixing said fermentable carbohydrate mixture with water and an absorbent (before or after adding yeast for fermentation), which is effective to absorb proteins, odors, colors and/or flavors from the mixture; and heating to elevated temperature;

adding yeast to the resulting mixture in sufficient amounts to convert carbohydrates to ethyl alcohol and fermenting until fermentation is substantially complete to form a fermented intermediated beer;

separating absorbent and other solids from the fermented intermediate beer; and contacting the resulting beer with at least one food grade adsorption resin, and preferably one or more ion exchange resins, to decharacterize the beer by removing undesirable odors, flavors and colors.

The resulting substantially purified beer comprises a flavorless malt base to which one or more flavors can be added to form a malt based beverage of any of several flavors.

BRIEF DESCRIPTION OF THE DRAWING

Reference is now made to the drawings accompanying the application wherein the FIGURE is a flow sheet illustrating the method of fermentation and purification of the invention.

DESCRIPTION OF PREFERRED EMBODIMENTS

As noted above, the invention is concerned with a flavorless malt base which can subsequently be converted to a flavored malt beverage wherein the flavor can be varied and optimized as desired. In the method of the invention, a flavorless malt base is produced which is eminently suitable as a stock base for such flavored malt beverages since substantially all of the flavors, odors and colors have been removed from the solution.

In one aspect, the invention is based on the discovery that when an absorbent such as activated carbon is introduced into the fermentable carbohydrate mixture, the absorbent will be effective to substantially remove the flavors, odors and colors normally found in a fermented beer. The absorbent can be added before or after fermentation. After removal of the yeast and absorbents, the resulting fermented intermediate beer can then be subjected to treatment with one or more food grade ion exchange resins and/or food grade adsorption resins to further decharacterize the beer by decolorizing, deodorizing and deflavoring the fermented solution. This results in a malt base which has substantially no flavor, substantially no odor and substantially no color, and which makes the base eminently suitable for preparation of a wide variety of malt beverages which can have various flavors and colors.

In the method of the invention, a fermented malt base is prepared using carbohydrates which may be derived from malt grain and adjunct sweeteners. In general, preferred malted grains comprise malted barley and rye and mixtures thereof, and mixtures with adjuncts. Preferably, the malt base should contain at least about 25 wt. % of fermentable carbohydrates derived from malted barley and can contain from 25 wt. % to 100 wt. % of such malted barley fermentable carbohydrates. Preferably, however, a ratio of about 25 wt. % of fermentable carbohydrates derived from malted barley and about 75 wt. % by weight of fermentable carbohydrates derived from adjunct materials are used. Adjunct materials are typically high fructose corn syrup mixtures of commercially available syrup extracts, but can be any material which can be fermented in the process of the invention to yield the product. Various types of malt premixes or mixtures of whole grains, ground grain extracts or prepared extracts and adjuncts are available for use as the fermentable carbohydrate mixture to be fermented.

This malt premix or fermentable carbohydrate mixture is then subjected to a preliminary heating and absorption step prior to fermentation with yeast to convert the carbohydrates to alcohol. As shown in the Figure, a preferred procedure is to introduce a malt extract by line 1 into a cooker/fermenter vessel together with water from line 3. Preferably, sufficient water is introduced by line 3 into the cooker/fermenter vessel 10 to form a solution of approximately 10–30 wt. %, preferably 20 wt. %, of dissolved solids in water. Depending on the sugar content of the malt extract, additional sweetener (sugar such as dextrose) may be introduced into the cooker/fermenter vessel by line 2. The temperature of the water solution in the cooker/fermenter vessel is maintained by steam through lines 6 and 6' and by cooling water in lines 8 and 8'.

It is a feature of the invention that an absorbent material and preferably a powdered activated carbon such as the commercial product Darko™, is also introduced into the cooker/fermenter vessel in order to absorb proteins, flavors, odors, color and other impurities from the solution. Darko™ is a commercially available powder activated carbon. Darko KB™ or KBB™ is the preferred activated carbon. Preferably about 1–5 grams per liter of water of the activated carbon is added to the mixture. The absorbent treatment can be carried out before or after the heating step, and can be carried out prior to or subsequent to fermentation, even after unused yeast is removed.

It is a further feature of the invention that this initial mixture is subjected to a heating step prior to fermentation.

Prior to addition of the malt ingredients and the activated carbon to the cooker/fermenter vessel 10, the temperature of the water contained in the cooker/fermenter vessel 10 is raised to 120° to 150° F., preferably 135° to 145° F., with moderate agitation at which time the malt ingredients are added to the water in the cooker/fermenter vessel 10. After the activated carbon is added, the resulting mixture is then heated to boiling and boiling is continued for 0.5 hours to 3 hours with sufficient stirring to maintain the activated carbon in suspension. This step permits the activated carbon to absorb proteins, flavors and colors from the malt ingredients. During this heating step, there is an approximately 5–15% volume reduction in the cooker/fermenter vessel 10 by evaporation of water.

After the boiling step is completed, the temperature of the cooker/fermenter vessel is reduced to about 65° to 85° F., preferably about 70° F., with continued stirring of the vessel. Then, a viable yeast, such as typically dry Bakers Yeast, is added to the vessel by line 7 to initiate and facilitate the conversion of the fermentable carbohydrates to ethyl alcohol. As is well known to those in the beer making art, the amount of yeast to be added may vary widely, but preferably will range from about 0.1 to about 2 wt. % of the malt extract solids. Preferably about 0.25 to about 1.0 grams of active yeast are added per liter of liquid to initiate and complete the fermentation.

Saccharification enzymes may also be added to the vessel through line 5 to assist in converting the carbohydrates to sugar. Normally, the malt premix will contain its own enzymes so enzymes need only be added if the malt premix contains insufficient enzymes to convert the starchldextrins to sugar. The enzymes in the malt premix may have been deactivated in the heating, boiling or manufacturing step so additional enzymes may need to be added. About 0.1 to about 5 wt. % of enzyme is preferable but generally the mixture should contain about 0.1 ml of enzymes per liter of solution. Preferred enzymes are amyloglucosidase and beta-gluconase.

The fermentation is then allowed to proceed while maintaining stirring or recirculation within the vessel to keep the powdered activated carbon in suspension. At that stage, the temperature should be maintained in the range of 65° to 75° F., with periodic sampling to determine pH and the weight percent sugar remaining in the solution. Usually, the measurement of the sugar content is referred to as Brix, a term known to those of skill in the art to define the weight percent of sugar.

The fermentation will normally require 3–5 days and is continued until the Brix of the solution is zero which indicates fermentation is complete.

When the fermentation is complete, the solution is cooled and then pumped by pump 11 through filter 12 for cold filtration at a temperature in the range of 35° to 50° F. using any type of filter apparatus. In this invention, it is preferred to filter the mixture with a filter aid such as diatomaceous earth. A slow rate of filtration is preferred for best results so that all solids are retained on the filter.

The resulting filtrate from the filter is then passed to a storage tank 13 where it is maintained in preparation for further resin treatment. Preferably, the beer is refrigerated at a temperature of 35° to 45° F. and ideally using a carbon dioxide blanket in the tank.

This pretreated beer is then further subjected to additional purification and clarification by the use of one or more resins in sealed columns to further decharacterize the beer. In the preferred embodiment of the invention, the beer is subjected to treatment in columns in series with an anionic resin, a cationic resin, and an adsorption resin in order to decharacterize the beer and remove undesirable substances in the beer which adversely affect color, flavor, odor and shelf life of the beer. In this preferred aspect, pretreated beer from storage tank 13 is pumped by pump 14 into anionic resin column 15. This column and the other columns contain food grade ion exchange resins and food grade adsorption resins. Typically, the beer is treated by pumping the beer through the resin beds in sealed columns in series. The first column 15 contains a food grade anionic exchange resin of the type well known to those of skill in the art and preferably contains the commercially available anionic exchange resin beads Dowex 66. In this column, the resin beads bind to anionic substances in the beer so as to remove them from the beer. This treatment is effective to remove undesirable anionic substances which may adversely affect the color, odor, flavor and/or shelf life of the resulting beer.

While the column treatment is preferably conducted in a sealed system and under pressure, an atmospheric procedure can also be used.

The treated product from the anionic resin column is then transferred to the cationic resin column 16. This column contains a food grade cationic exchange resin of the type known to those of skill in the art but preferably contains the commercial product Dowex 88. In this cationic exchange resin column, the beads bind with cations. This treatment is effective to remove cationic substances which include undesirable colors, odors and flavors from the beer.

The treated beer from cationic column 16 is then sent to adsorption resin column 17 for treatment with a food grade adsorption resin of the type known to those of skill in the art such as Dowex L-285 or Dowex SD2. In this adsorption column, the resin beads adsorb undesirable colors, odors, and flavors, and other components, and further decharacterize the beer.

In this column treatment, it is preferable that the temperature of the beer be maintained at an ambient temperature or as low as 35° F. Therefore, a range of 35° F. to 70° F. is preferred. The preferred continuous flow rate through the three resin beds should be sufficiently slow that there is good contact between the beer and the resin beads. Through experimentation, it has been found that the flow rate should be no greater than about 0.242 gallons of beer per minute per square foot of resin bed area.

In an optional embodiment, the treated beer recovered from the adsorption resin column may then be passed to a carbon slurry tank 19 for a further treatment with powdered or granular activated carbon. In this procedure, the beer is introduced into tank 19 and the carbon particles are introduced through 18. In this procedure, the carbon is maintained in suspension by stirring or recirculation of the liquid and the carbon treatment is carried out at a temperature in the range of 50° to 80° F. for 1 to 24 hours. After the carbon treatment is completed, the resulting product, after a further filtration to remove the activated carbon, is transferred to storage tank 20 where it is preferably maintained under a carbon dioxide blanket and at a temperature in the range of 40 to 50° F.

While the three-column treatment in series is a preferred embodiment of the invention, it is also within the scope of the invention to treat the beer in only one resin column, preferably the adsorption column 17 to remove undesirable colors, odors, flavors and other components. If only a single column treatment is used, then the supplemental carbon treatment step could be used to further clarify the solution.

The resulting beer product is a malt base which is flavorless and can be used in the formulation of malt beverages of various kinds. Such malt beverages may be flavored with any desired flavor so as to result in a unique product, that is, a beer in which the taste can be controlled by the addition of flavoring agents. This malt base is characterized by the following data:

(a) Alcohol content: Typically 10 to 12% v/v/;
(b) ph: 4.5 plus or minus 0.2;
(c) Color: absorbance at 430 nanometers: 0.03 (Color Test Method: AOAC 9.006);
(d) Acetaldehyde content: 2–8 ppm, preferably about 4 ppm;
(e) N-propyl alcohol content: 6–12 ppm, preferably about 8 ppm;
(f) Methanol content: 7–12 ppm, preferably about 10 ppm;
(g) Total Solids: less than 1%;
(h) Residual carbohydrates content: 2000–4000 ppm, preferably about 3000 ppm;
(i) Glycerol content: 5000–7000 ppm, preferably about 6000 ppm.

As described herein in the preferred embodiment, the treatment with an absorbent such as activated charcoal is carried out prior to the fermentation step. However, it has also been discovered that the absorbent treatment can be carried out at any point in the process. For example, the absorbent treatment is also effective if carried out subsequent to fermentation, before or after each column treatment, or as the last step in the procedure.

It is also within the scope of the invention to regenerate the treatment columns for reuse in further batch procedures. For example, the anionic column can be regenerated by treatment with a caustic solution followed by a water wash including back flushing and then storing the column in a 50% ethanol solution. The cationic column can be regenerated by treatment with a hydrochloric acid solution followed by flushing with water and storage in a 50% ethanol solution. The adsorption column can be regenerated in the same manner as the anionic column. The base and acid washes should be sufficient so that the liquid is generally clear on the completion of regeneration.

The following examples are presented to illustrate the invention but it is not to be considered as limited thereto.

EXAMPLE 1

To a cleaned and sanitized 40 liter cooker, 24.3 liters of city water were introduced and heated to 140° F. with moderate agitation. Thereafter, 8.1 kilograms of malt ingredients as a malt prefix concentrate were slowly added to the water in the cooker. In addition, 2 grams per liter of Norit Darko KBB™ activated carbon (60 grams) were introduced into the cooker. This mixture was then heated to a boil and boiling was continued for one hour at which time there was approximately a 12% volume reduction. During this boiling process, proteins contained in the malt concentrate precipitate and are absorbed by the activated carbon.

After the boiling step, the temperature was then reduced to about 80° F. and 0.1 ml per liter of Novo Nordisk AMG enzyme (3 ml) were added to the mix and agitation was reduced to a slow stir. Then 0.5 grams per liter of Bakers Active Dry Yeast (15 grams) were added. While maintaining this slow agitation, fermentation was allowed to proceed. After one hour the temperature was reduced to 70° F. and a sample taken and measured for pH and Brix or wt. % sugar content. The fermentation was conducted for 3–5 days until the Brix of the solution measured 0.

The resulting fermented intermediate beer was then cooled to 40° F. The fermented intermediate beer was then filtered through a 12 inch Ertel plate and frame filter housing containing four 12 inch diameter Cellulo 0755 filter pads. The filter pads were precoated with Cellulo standard diatomaceous earth (D.E.) filter aid at 0.75 grams per liter (22.5 grams). 2 grams per liter of Diatomaceous Earth were also added to the beer as body feed (60 grams). The beer was then slowly filtered into a clean and sanitized vessel. The pressure drop on the filter should be no greater than about 30 psi and the flow rate should be kept at 0.06 gallons per minute per square foot which is 0.2 gallons per minute. This flow rate is maintained in order to prevent undesirable materials from passing through the filter.

After the filter step, the filtered fermented intermediate beer was then stored under a carbon dioxide blanket under refrigeration conditions.

The filtered fermented intermediate beer was then subjected to treatment with 2 food grade deionization resins and a food grade adsorption resin. In the first treatment, the filtered fermented intermediate beer was pumped in a closed system through an anionic exchange resin containing Dowex 66 anionic resin. The column was first fluidized and then the filtered fermentation intermediate beer was pumped through the column at a flow rate of about 60 ml per minute.

The treated malt base recovered from the anionic column was then pumped through the cationic exchange resin column containing Dowex 88.

The effluent from the cationic exchange resin was then pumped at the continuing rate of 60 ml per minute to the top of an adsorption exchange resin column containing Dowex L-285.

The effluent from the third or adsorption column is then subjected to a final carbon treatment by the addition of powdered activated carbon and maintaining the carbon in a stirred aqueous suspension. Diatomaceous Earth was then stirred into the mixture and the mixture was filtered using the Ertel and Cellulo pads as described above for the filtration step. The resulting flavorless malt base was then stored under refrigeration conditions. The malt base had the following characteristics:

a) Alcohol content: Typically 10 to 12% v/v;
b) ph: 4.5 plus or minus 0.2;
c) Color: absorbance at 430 nanometers: 0.03 (Color Test Method AOAC 9.006);
d) Acetaldehyde content: 4 ppm;
e) N-propyl alcohol content: 8 ppm;
f) Methanol content: 10 ppm;

g) Total Solids: less than 1%;

h) Residual carbohydrates content: 3000 ppm

I) Glycerol content: 6000 ppm

The invention has been described with certain preferred embodiments. However, as obvious variations thereon will become apparent to skill in the art, the invention is not to be considered as limited thereto.

What is claimed is:

1. A method for the preparation of a flavorless malt base comprising the steps of:

a) heating an aqueous solution containing a fermentable carbohydrate mixture derived from malt extract containing malted grain suitable for fermentation;

b) adding yeast to the mixture to convert the carbohydrates contained in the fermentable carbohydrate mixture to ethyl alcohol and to form a fermented intermediate beer and insolubles;

c) separating the insolubles from the resulting fermented intermediate beer; and d) subjecting the fermented intermediate beer to treatment, in series, with an anion exchange resin, a cation exchange resin and an adsorption resin to decharacterize the beer and form the flavorless malt base, wherein the method further includes a step of adding an absorbent to the aqueous solution before or after adding the yeast.

2. A method according to claim 1, wherein the absorbent is activated carbon.

3. A method according to claim 1, wherein an enzyme is added to the mixture during fermentation.

4. A method according to claim 1, wherein the separation step comprises filtering the fermented intermediate beer at a temperature of 35° to 45° F. to remove unused yeast and the absorbent from the beer.

5. A method according to claim 1, wherein the malt base recovered from the adsorption column is subjected to a further treatment with activated carbon.

6. A method for the preparation of a flavorless malt base comprising the steps of:

a) heating an aqueous solution containing a fermentable carbohydrate mixture derived from malt extract containing malted grain suitable for fermentation in the presence of an absorbent in sufficient amount to absorb proteins from the mixture;

b) adding yeast to the mixture to convert the carbohydrates contained in the fermentable carbohydrate mixture to ethyl alcohol;

c) continuing the fermentation to form a fermented intermediate beer and insolubles;

d) separating the insolubles from the resulting fermented intermediate beer; and e) subjecting the fermented intermediate beer to treatment, in series, with an anion exchange resin, a cation exchange resin and an adsorption resin to decharacterize the beer and form the flavorless malt base.

7. A method according to claim 6, wherein the absorbent is activated carbon.

8. A method according to claim 6, wherein an enzyme is added to the mixture during fermentation.

9. A method according to claim 6, wherein the separation step comprises filtering the fermented intermediate beer at a temperature of 35° to 45° F. to remove unused yeast and the absorbent.

10. A method according to claims 6, wherein the malt base recovered from the adsorption column is subjected to a further treatment with activated carbon.

11. A method for the preparation of a flavorless malt base comprising the steps of:

a) heating an aqueous solution containing a fermentable carbohydrate mixture derived from malt extract containing malted grain suitable for fermentation;

b) adding yeast to the mixture to convert the carbohydrates contained in the fermentable carbohydrate mixture to ethyl alcohol and insolubles, and continuing the fermentation to form a fermented intermediate beer;

c) adding an absorbent to the fermented intermediate beer in sufficient amounts to absorb proteins;

d) separating the insolubles from the resulting fermented intermediate beer; and e) subjecting the fermented intermediate beer to treatment, in series, with an anion exchange resin, a cation exchange resin and an adsorption resin to decharacterize the beer and form the flavorless malt base.

12. A method according to claim 11, wherein the absorbent is activated carbon.

13. A method according to claim 11, wherein an enzyme is added to the mixture during fermentation.

14. A method according to claim 11, wherein the separation step comprises filtering the fermented intermediate beer at a temperature of 35° to 45° F. to remove unused yeast and the absorbent.

15. A method according to claims 11, wherein the malt base recovered from the adsorption column is subjected to a further treatment with activated carbon.

16. A method for the preparation of a flavorless malt base comprising the steps of:

a) heating an aqueous solution containing a fermentable carbohydrate mixture derived from malt extract containing malted grain suitable for fermentation;

b) adding yeast to the mixture to convert the carbohydrates contained in the fermentable carbohydrate mixture to ethyl alcohol and to form a fermented intermediate beer and insolubles;

c) separating the insolubles from the resulting fermented intermediate beer; and d) subjecting the fermented intermediate beer to treatment, in series, with an cation exchange resin, a anion exchange resin and an adsorption resin to decharacterize the beer and form the flavorless malt base, wherein the method further includes a step of adding an absorbent to the aqueous solution before or after adding the yeast.

17. A method according to claim 16, wherein the separation step comprises filtering the fermented intermediate beer at a temperature of 35° to 45° F. to remove unused yeast and the absorbent from the beer.

18. A method according to claim 16, wherein the malt base recovered from the adsorption column is subjected to a further treatment with activated carbon.

* * * * *